US012809411B2

(12) United States Patent
Sperling et al.

(10) Patent No.: US 12,809,411 B2
(45) Date of Patent: Nov. 24, 2026

(54) DISTRIBUTED VOLTAGE REGULATION BY CURRENT SHARING

(71) Applicant: INTERNATIONAL BUSINESS MACHINES CORPORATION, Armonk, NY (US)

(72) Inventors: Michael Sperling, Poughkeepsie, NY (US); Jens Daci, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 18/462,532

(22) Filed: Sep. 7, 2023

(65) Prior Publication Data

US 2025/0085732 A1 Mar. 13, 2025

(51) Int. Cl.
*G05F 1/575* (2006.01)
*G06F 1/26* (2006.01)

(52) U.S. Cl.
CPC ................ *G05F 1/575* (2013.01); *G06F 1/26* (2013.01)

(58) Field of Classification Search
CPC ........... G06F 1/26; G06F 1/3203; G05F 1/575
See application file for complete search history.

(56) References Cited

U.S. PATENT DOCUMENTS

| | | | | |
|---|---|---|---|---|
| 7,405,545 | B2 * | 7/2008 | Yang | G05F 3/242 323/275 |
| 8,008,901 | B2 | 8/2011 | Tang et al. | |
| 9,372,490 | B1 | 6/2016 | Kose et al. | |
| 9,917,513 | B1 * | 3/2018 | Le | G05F 1/56 |
| 10,025,333 | B2 | 7/2018 | Maeng et al. | |
| 10,698,432 | B2 * | 6/2020 | Shih | G05F 1/563 |
| 10,866,608 | B2 | 12/2020 | Ho et al. | |
| 11,249,530 | B1 * | 2/2022 | Pal | G05F 1/59 |
| 2010/0060078 | A1 | 3/2010 | Shaw | |
| 2010/0109435 | A1 * | 5/2010 | Ahmadi | G06F 1/26 307/31 |
| 2016/0291619 | A1 * | 10/2016 | Guan | G05F 1/56 |
| 2019/0354163 | A1 * | 11/2019 | Bodnaruk | G06F 13/4282 |
| 2019/0384337 | A1 * | 12/2019 | Lu | G05F 1/575 |
| 2022/0302089 | A1 * | 9/2022 | Rusu | H01L 25/105 |

FOREIGN PATENT DOCUMENTS

WO 2014051721 A1 4/2014

OTHER PUBLICATIONS

Selcuk Kose, Thermal Implications of On-Chip Voltage Regulation: Upcoming Challenges and Possible Solutions, 2014 61st ACM/EDAC/IEEE Design Automation Conference (DAC), DOI: 10.1145/2593069.2593231, dated Jun. 2014, 7 pages.

* cited by examiner

*Primary Examiner* — Jaweed A Abbaszadeh
*Assistant Examiner* — Gayathri Sampath
(74) *Attorney, Agent, or Firm* — Onyx IP Group

(57) ABSTRACT

Distributed voltage regulation by current sharing including receiving an input voltage on a chip; and regulating the input voltage using current sharing through a plurality of distributed low voltage dropout micro regulators to produce regulated voltage, each low voltage dropout micro regulator including an additional degenerative pass device providing gain reduction with improved current sharing and local feedback.

20 Claims, 8 Drawing Sheets

Circuit 400

Chip 500

DISTRIBUTED VOLTAGE REGULATION BY CURRENT SHARING

BACKGROUND

Field of the Disclosure

The field of the disclosure is voltage regulation, or, more specifically, methods, apparatus, and products for distributed voltage regulation by current sharing.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As semiconductors become smaller with higher performance requirements, they require multiple lower input voltages to perform more efficiently. Chips including processors with multiple cores and other areas such as the cache and other memory have specific voltage requirements. One solution is using embedded buck converters that use off-chip passive inductors that are expensive as well as passive components like capacitors and resistors; semiconductors, such as diodes and transistors; and magnetic parts that bring an increase in the number of required parts and complexity in design. Another solution is a re-distribution layer on the package with digital control, which is susceptible to latency and voltage droops and requires additional resources to implement. Another solution is micro-regulators distributed on the chip switching digitally which requires fine control of the PFET (P-type field effect transistor) size and is also susceptible to higher latency and lower performance. A better solution is desired.

SUMMARY

Methods, apparatuses, and products for distributed voltage regulation by current sharing according to various embodiments are disclosed. Distributed voltage regulation by current sharing can include: receiving an input voltage on a chip; and regulating the input voltage using current sharing through a plurality of distributed low voltage dropout micro regulators to produce regulated voltage, each low voltage dropout micro regulator including an additional degenerative pass device providing gain reduction with improved current sharing and local feedback.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

As semiconductors become smaller with high performance demands, for efficiency and to prevent overheating, they use lower voltage and require smaller input voltage. As core counts increase, reducing the number of external power rails reduces cost. Efficient, stable, and reliable operation of power delivery is crucial to sustain the high performance and low power design targets of modern integrated circuits (ICs). In order to better regulate voltage, voltage regulators are moved from outside the chip to onboard the chip to save board area and to enable efficient, fast, and secure localized voltage regulation. The different units benefit from fine control of the on-chip voltage.

Distributed on-chip voltage regulation is where multiple on-chip voltage regulators are connected in parallel and distributed across the power grid to supply current across the whole chip. The distributed voltage regulators are connected to a passive mesh network, which supplies the required current to the load circuits.

Figure 1:
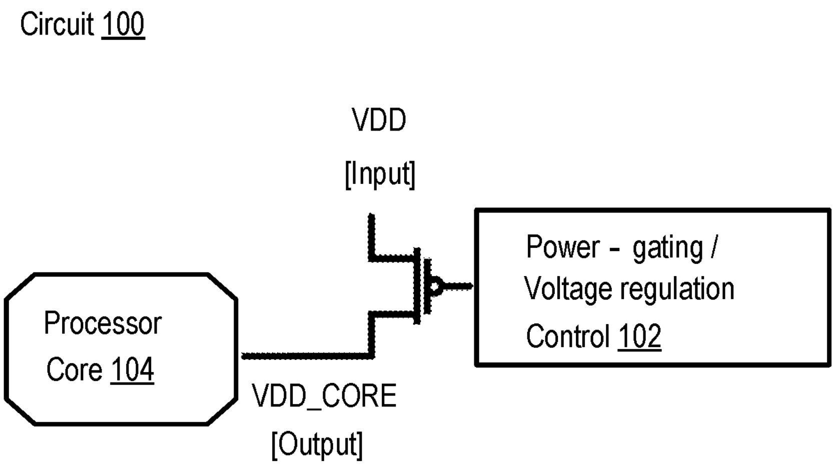
FIG. 1 a block diagram of an example circuit configured for distributed voltage regulation by current sharing in accordance with embodiments of the present disclosure.

Low dropout regulators are physically small, needing neither large inductors nor transformers; generate low noise as no switching takes place; and have design simplicity as they typically consist of a reference, an amplifier, and a pass element. Generally, LDO regulators have low dropout, fast transient response, and excellent line and load regulation. When operating in the saturation region, an LDO operates as a voltage-controlled current source. An exemplary LDO 100 is shown in FIG. 1 with input VDD, a power-gating and voltage regulation control 102 and VDD CORE as output to a load such as processor core 104.

Figure 2:
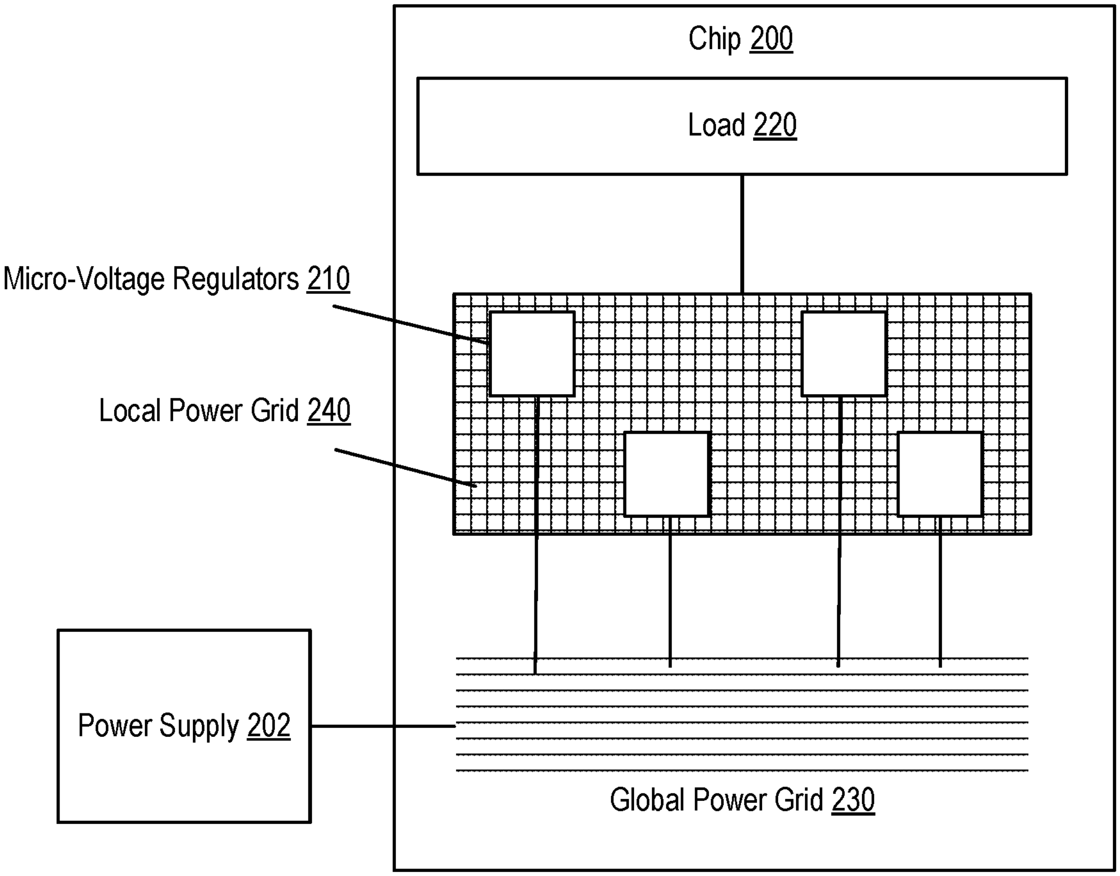
FIG. 2 is a flowchart of an example block diagram for distributed voltage regulation by current sharing according to some embodiments of the present disclosure.

Exemplary apparatus and systems for providing distributed voltage regulation by current sharing in accordance with the present disclosure are described with reference to the accompanying drawings, beginning with FIG. 2. FIG. 2 sets forth an example block diagram of an exemplary chip 200 configured for distributed voltage regulation by current sharing according to embodiments of the present disclosure. The chip 200 of FIG. 2 receives power from power supply 202 external to the chip and includes distributed micro-voltage regulators 210 as well as load 220 which includes multiple cores and cache. The distributed micro-voltage regulators 210 receive power from global power grid 230 by bumps or vias or other connects (not shown) and regulate the power to supply local power grid 240 that powers the load 220. The number and location of the micro-voltage regulators 210 can be determined based up on thermal and board characteristics.

Figure 3:
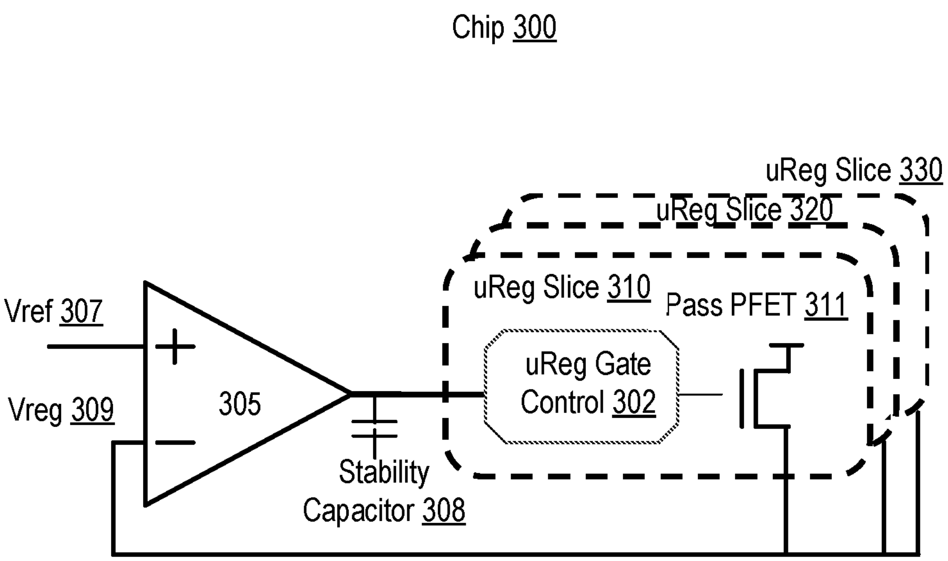
FIG. 3 a block diagram of an example chip configuration for distributed voltage regulation by current sharing in accordance with embodiments of the present disclosure.

For further reference, FIG. 3 sets forth a block diagram of a conventional chip configuration 300 for distributed voltage regulation. The conventional chip configuration 300 is a typical chip configuration of distributed on-chip voltage regulation using low dropout regulators or micro regulators. The conventional chip configuration 300 is described herein more specifically and includes comparator or amplifier 305 that receives reference voltage Vref 307 at a non-inverting input terminal "+". Vreg 309 is connected to the inverting input terminal "−". The reference voltage Vref is a preset reference signal. The comparator 305 is connected to a stability capacitor 308 and to many micro regulators (uReg slices) 310, 320, 330 that include microregulator gate controls 302, 312, 332 (312, 323 not shown) and pass PFET (P-type field effect transistor) 311, 321, 331 (321, 331 not shown) that will be described in more detail hereinbelow. The conventional LDO of chip configuration 300 includes both the micro regulator gate control 302 and pass PFET 311.

The conventional chip configuration 300 provides uneven current due to mismatches between micro regulator slices 310, 320, 330. While micro regulator slices 310, 320, 330 are selected to be matched in physical characteristics, small differences caused by process tolerances lead to some micro regulators providing more current than other micro regulators. The mismatch and uneven power distribution and current cause increased risk of electromigration and eventually failure.

Figure 4A:
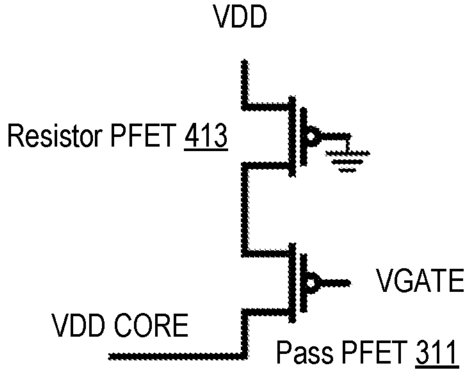
FIG. 4A a block diagram of an example circuit configuration for distributed voltage regulation by current sharing in accordance with embodiments of the present disclosure.

For further reference, FIG. 4A sets forth a block diagram of an exemplary circuit configuration 400 for distributed voltage regulation by current sharing in accordance with some embodiments of the present disclosure. In FIG. 4A, the LDO micro regulator of FIG. 3B includes a pass PFET 311 and includes an additional resistor PFET 413 above the pass PFET 311. It should be understood that the resistor PFET 413 above the pass PFET 311 acts as a degenerative resistance and is a current limiter that provides local feedback. The resistor PFET 413 may be placed in the circuit configuration 400 in other locations so that it acts as a degenerative resistance for the LDO.

Figure 4B:
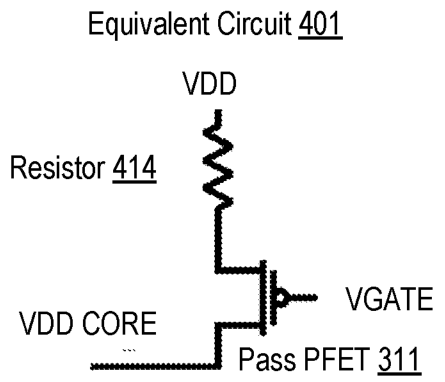
FIG. 4B a block diagram of an example circuit configuration for distributed voltage regulation by current sharing in accordance with embodiments of the present disclosure.

For further reference, FIG. 4B sets forth a block diagram of an exemplary equivalent circuit 401 of the exemplary circuit configuration 400 for distributed voltage regulation by current sharing of FIG. 4A. In the equivalent circuit 401, the LDO micro regulator includes a pass PFET 311 and a resistor 414 that acts as a degenerative resistance to limit current and to provide local feedback.

Figure 5A:
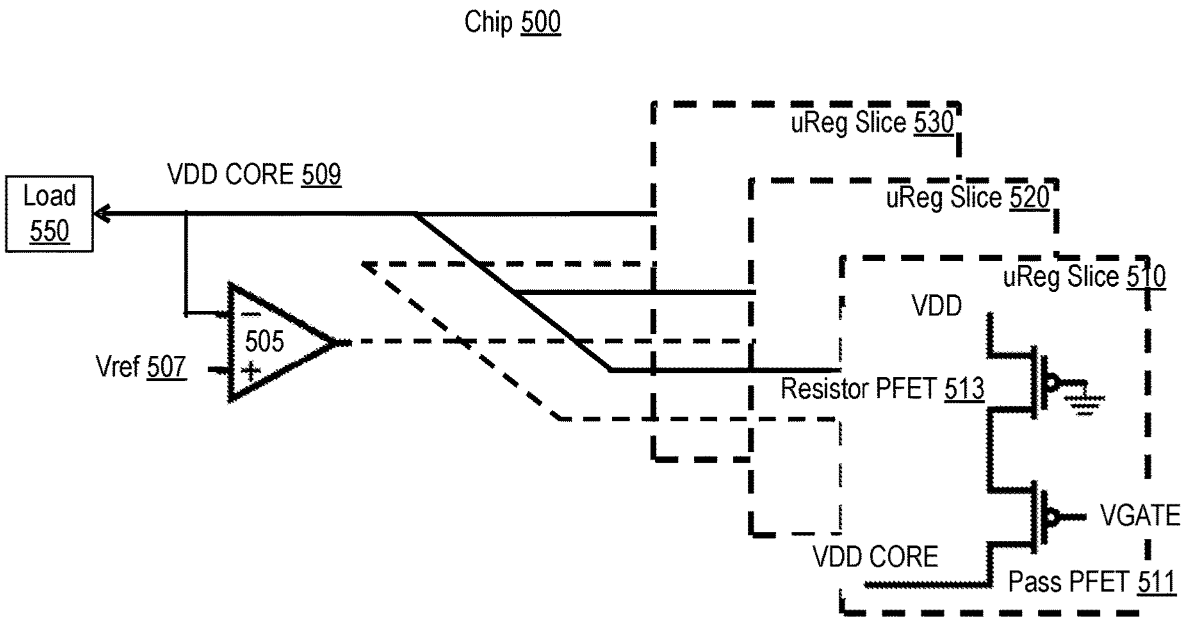
FIG. 5A a block diagram of an example chip configuration for distributed voltage regulation by current sharing in accordance with embodiments of the present disclosure.

For further reference, FIG. 5A sets forth a block diagram of an exemplary chip configuration 500 for distributed voltage regulation by current sharing in accordance with some embodiments of the present disclosure. The example chip configuration 500 includes comparator or amplifier 505 that receives reference voltage Vref 507 at a non-inverting input terminal "+". VDD_CORE or input voltage 509 is connected to the inverting input terminal "−" The reference voltage Vref is a preset reference signal. The comparator or amplifier 505 is connected to many micro regulator slices 510, 520, 530, pass PFET 511 and additional resistor PFET 513 that will be described in more detail hereinbelow. It should be understood that while three micro regulators, pass PFET and resistor PFET are shown in FIG. 5, there may be additional micro regulators, pass PFET and resistor PFET in the chip configuration 500, including for each power rail. In some embodiments, the micro regulator has a different LDO circuit design that includes a conventional pass PFET and also has the additional resistor PFET. The micro regulators, pass PFET and resistor PFET make a low dropout voltage regulator that, when operating in the saturation region, amplifies current and error and operates as a voltage-controlled current source with a self-limiting current limit. The micro regulators are spread out across the chip to provide current to the load 550, similar to the chip configuration of FIG. 2. The load 550 includes one or more processor cores coupled to cache.

In the exemplary chip configuration 500 of FIG. 5, the additional resistor PFET 513 provides a source degenerative resistance that provides improved current sharing. The additional resistor PFET 513 is an additional degeneration resistance that is controlled with ground. In some embodiments, the additional resistor PFET 513 could be controlled with power such as a mid-voltage or could be replaced with a resistor. The degenerative resistance limits the current so that it will be shared more evenly among all the micro regulator slices 510, 520, 530. This protects from the high-side, i.e., connecting the load to the power supply, and allows all the micro regulator slices 510, 520, 530 to work properly by self-limiting or weakening the strong micro regulators and allowing other micro regulators to provide more even current, in effect strengthening the weak micro regulators.

Figure 5B:
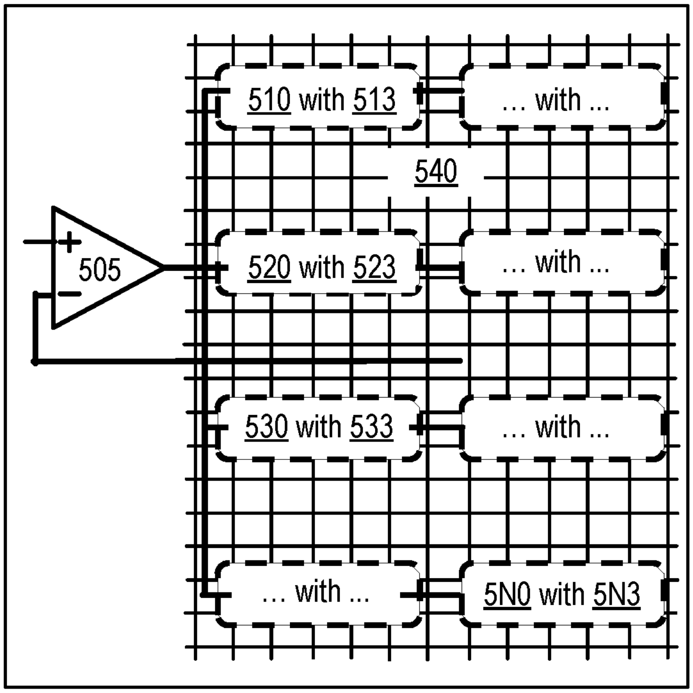
FIG. 5B a block diagram of an example chip configuration for distributed voltage regulation by current sharing in accordance with embodiments of the present disclosure.

For further reference, FIG. 5B sets forth a block diagram of an exemplary chip configuration 500 for distributed voltage regulation. The block diagram provides another view of the exemplary chip configuration 500 for distributed voltage regulation by current sharing in accordance with some embodiments of the present disclosure. The chip configuration 500 includes comparator or amplifier 505 and micro regulator slices 510, 520, 530, . . . 5N0 with resistor PFET 513, 523, 533, . . . 5N3 with common gate input stages. The micro regulator slices 510, 520, 530, . . . 5N0 with resistor PFET 513, 523, 533, . . . 5N3 provide power to local power grid 540 which is used to power a load (not shown) that can be a core or a memory or other power device.

As noted in the conventional chip configuration 300 of FIG. 3, there are problems related to mismatches between the micro regulator slices 310, 320, 330 due to differences in process tolerances that lead to some micro regulator slices 310, 320, 330 providing more current than others. This leads to problems of uneven power delivery and increased risk of electromigration and eventual failure. The additional resistor PFET 513 in the LDO circuit of chip 500 of FIG. 5 provides degenerative resistance that provides local feedback to control for differences in physical tolerance of the micro regulator slices 510, 520, 530. Each micro regulator slice amplifies and provides local feedback to share current more evenly among all micro regulators.

Figure 6:
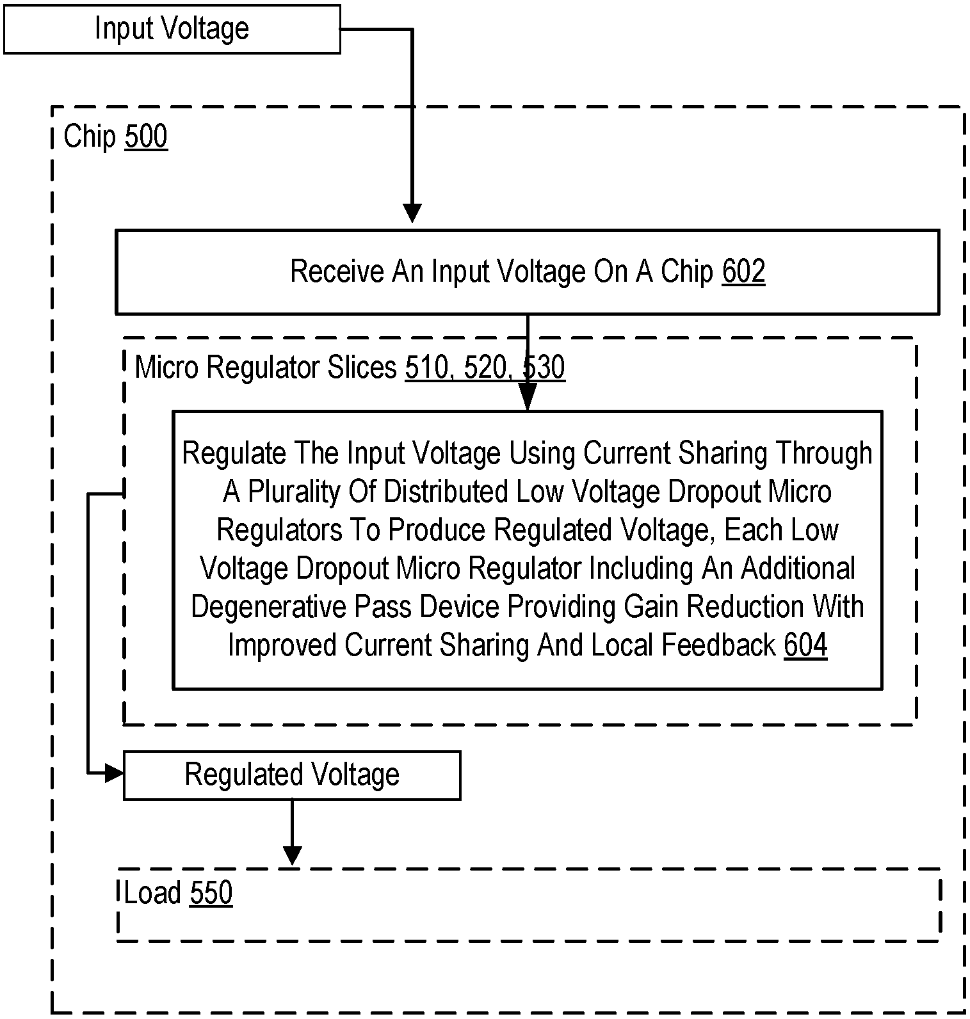
FIG. 6 is a flowchart of an example method for distributed voltage regulation by current sharing according to some embodiments of the present disclosure.

For further reference, FIG. 6 sets forth a flow chart of an example method of distributed voltage regulation by current sharing in accordance with some embodiments of the present disclosure. The method includes receiving 602 a voltage on a chip. Receiving 602 a voltage on a chip includes receiving an input voltage from a power supply external to the chip, such as chip 500 of FIG. 5.

The method of FIG. 6 also includes regulating 604 the input voltage using current sharing through a plurality of distributed low voltage dropout micro regulators to produce regulated voltage, each low dropout micro regulator including an additional degenerative pass device providing gain reduction with improved current sharing and local feedback. Regulating 604 the input voltage using current sharing through a plurality of distributed low voltage dropout micro regulators to produce regulated voltage, each low dropout micro regulator including an additional degenerative pass device providing gain reduction with improved current sharing and local feedback includes lowering the input voltage and sharing the current evenly among the micro regulators, with each micro regulator providing gain reduction with improved current sharing as well as extended gate voltage range and through the additional degenerative pass device providing local feedback that limits current in strong micro regulators and strengthens weak micro regulators. The plurality of distributed low voltage dropout micro regulators provides regulated voltage to a load such as load 550 of FIG. 5, which may be one or more core processors coupled to cache memory.

The additional degenerative pass device of FIG. 6 is a source degenerative resistance and can be a resistor PFET as described in FIG. 4A or a resistor as described in FIG. 4B. The additional degenerative pass device of FIG. 6 is controlled by ground in some embodiments and is controlled by power such as a mid-voltage in some embodiments.

The plurality of distributed low voltage dropout micro regulators of FIG. 6 is located in multiple locations on the memory and processor and, in some embodiments, including for each power rail.

In view of the explanations set forth above, readers will recognize a number of advantages of distributed voltage regulation by current sharing according to embodiments of the present disclosure including:

- Providing an efficient, fast, and secure localized voltage regulation.
- Providing an improved current sharing by placing an additional source degeneration resistance to the pass PFET that acts as a current limiter in each LDO micro regulator.
- Providing gain reduction with improved current sharing and local feedback in each LDO micro regulator.

Exemplary embodiments of the present disclosure are described largely in the context of a fully functional computer system for distributed voltage regulation by current sharing. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for distributed voltage regulation by current sharing, the method comprising:
- receiving an input voltage on a chip; and
- regulating the input voltage using current sharing through a plurality of distributed low voltage dropout micro regulators to produce regulated voltage,
  - each low voltage dropout micro regulator including a pass device and an additional degenerative pass device that includes a single resistor,
    - the single resistor providing gain reduction with improved current sharing and local feedback in the low voltage dropout micro regulator,
    - the single resistor controlling current in the low voltage dropout micro regulator to enable current sharing evenly among the plurality of distributed low voltage dropout micro regulators, and
    - the single resistor controlling the current in the low voltage dropout micro regulator by using the local feedback to limit current in the low voltage dropout micro regulator and allow more even current among the plurality of distributed low voltage dropout micro regulators.

2. The method of claim 1 wherein the additional degenerative pass device provides degenerative resistance.

3. The method of claim 2 wherein the single resistor includes a single resistor P-type field effect transistor (PFET) that is in addition to a pass PFET in the low voltage dropout micro regulator.

4. The method of claim 2 wherein the additional degenerative pass device is controlled by ground in the low voltage dropout micro regulator.

5. The method of claim 2 wherein the single resistor is in addition to a pass P-type field effect transistor (PFET) in the low voltage dropout micro regulator.

6. The method of claim 1 wherein the plurality of distributed low voltage dropout micro regulators are located in multiple locations on the chip.

7. An apparatus for distributed voltage regulation by current sharing, the apparatus comprising:
- a chip receiving an input voltage;
- a plurality of distributed low voltage dropout micro regulators on the chip regulating the input voltage using current sharing to produce regulated voltage,
  - each low voltage dropout micro regulator including a pass device and an additional degenerative pass device that includes a single,
    - the single resistor providing gain reduction with improved current sharing and local feedback in the low voltage dropout micro regulator,
    - the single resistor controlling current in the low voltage dropout micro regulator to enable current sharing among the plurality of distributed low voltage dropout micro regulators, and
    - the single resistor controlling the current in the low voltage dropout micro regulator by using the local feedback to limit current in the low voltage dropout micro regulator and allow more even current among the plurality of distributed low voltage dropout micro regulators; and
- a load on the chip receiving the regulated voltage.

8. The apparatus of claim 7 wherein the additional degenerative pass device provides degenerative resistance.

9. The apparatus of claim 8 wherein the single resistor includes a resistor P-type field effect transistor (PFET) that is in addition to a pass PFET in the low voltage dropout micro regulator.

10. The apparatus of claim 8 wherein the additional degenerative pass device is controlled by ground in the low voltage dropout micro regulator.

11. The apparatus of claim 8 wherein the single resistor is in addition to a pass P-type field effect transistor (PFET) in the low voltage dropout micro regulator.

12. The apparatus of claim 7 wherein the plurality of distributed low voltage dropout micro regulators are located in multiple locations on the chip.

13. A system for distributed voltage regulation by current sharing, the system comprising:

a memory;

a processor coupled to the memory; and a plurality of distributed low voltage dropout micro regulators regulating an input voltage using current sharing to produce regulated voltage, each low voltage dropout micro regulator including a pass device and an additional degenerative pass device that includes a single resistor, the single resistor providing gain reduction with improved current sharing and local feedback in the low voltage dropout micro regulator, the single resistor controlling current in the low voltage dropout micro regulator to enable current sharing among the plurality of distributed low voltage dropout micro regulators, and the single resistor controlling the current in the low voltage dropout micro regulator by using the local feedback to limit current in the low voltage dropout micro regulator and allow more even current among the plurality of distributed low voltage dropout micro regulators, wherein the memory and the processor receive the regulated voltage from the plurality of distributed low voltage dropout micro regulators.

14. The system of claim 13 wherein the additional degenerative pass device provides degenerative resistance.

15. The system of claim 14 wherein the single resistor includes a resistor P-type field effect transistor (PFET) that is in addition to a pass PFET in the low voltage dropout micro regulator.

16. The system of claim 14 wherein the additional degenerative pass device is controlled by ground in the low voltage dropout micro regulator.

17. The system of claim 14 wherein the single resistor is in addition to a pass P-type field effect transistor (PFET) in the low voltage dropout micro regulator.

18. The system of claim 13 wherein the plurality of distributed low voltage dropout micro regulators are located in multiple locations on the memory and the processor.

19. The system of claim 13 wherein the pass device and the additional degenerative pass device are connected in series.

20. The apparatus of claim 8 wherein the pass device and the additional degenerative pass device are connected in series.

* * * * *